June 10, 1930.                A. BESTELMEYER              1,762,380
                                OPTICAL PYROMETER
                              Filed July 16, 1926          2 Sheets-Sheet 1
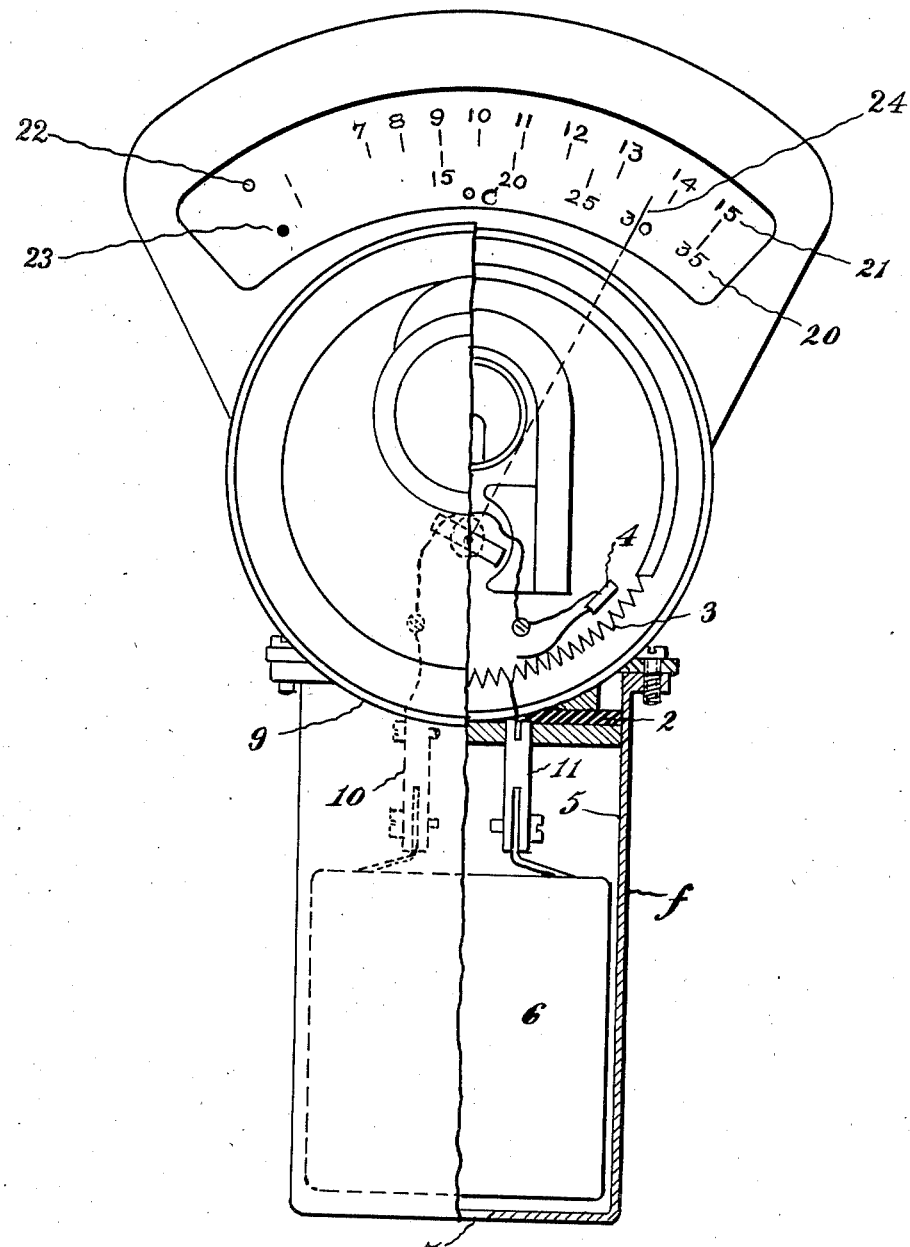
INVENTOR
Adolf Bestelmeyer
BY
Harold D. Penney,
ATTORNEY

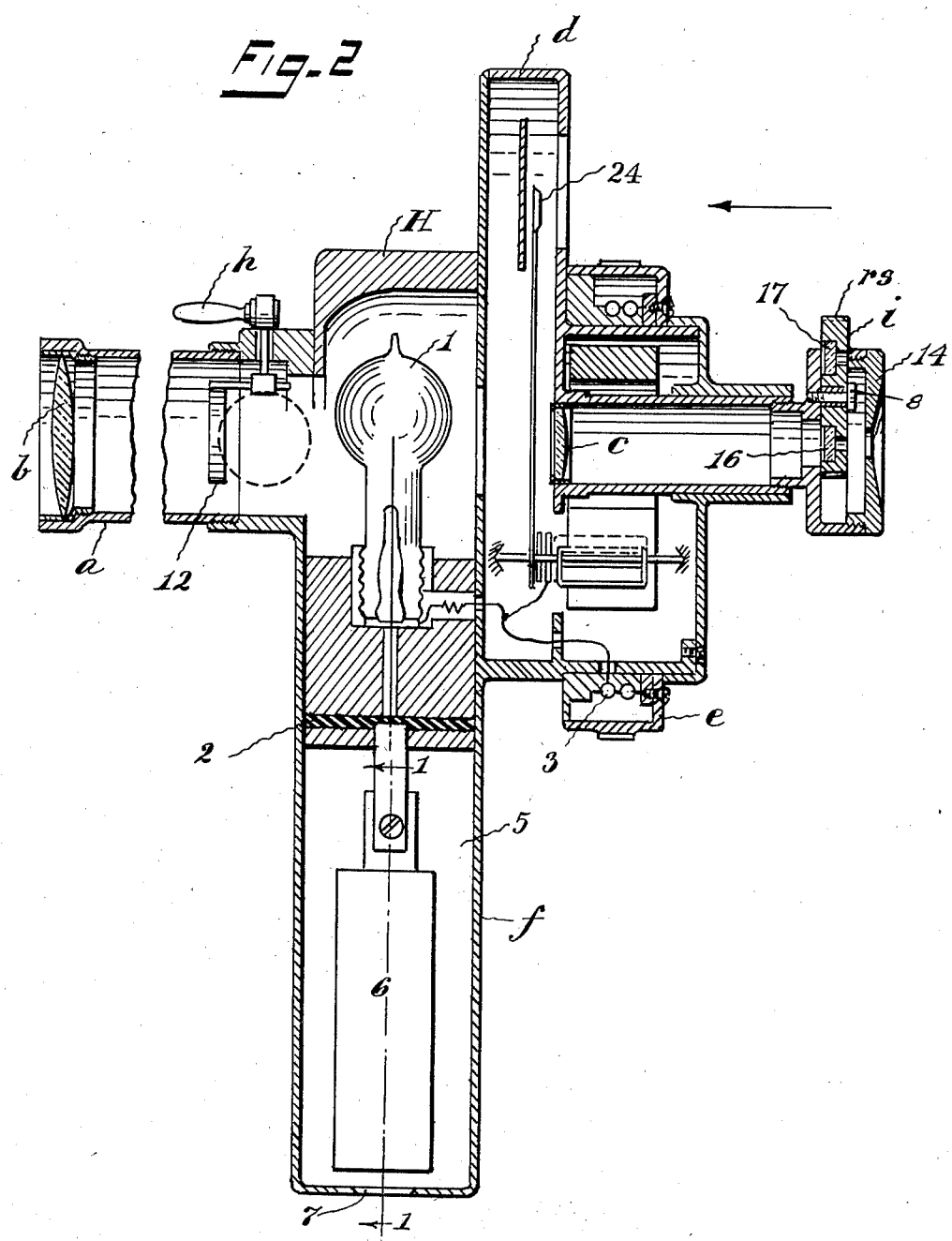

Patented June 10, 1930

1,762,380

UNITED STATES PATENT OFFICE

ADOLF BESTELMEYER, OF FRANKFORT-ON-THE-MAIN, GERMANY, ASSIGNOR TO HARTMANN & BRAUN AKTIENGESELLSCHAFT, OF FRANKFORT (MAIN) WEST, GERMANY

OPTICAL PYROMETER

Application filed July 16, 1926. Serial No. 122,906.

My present invention relates to an improvement in optical pyrometers, and has for its object the provision of means whereby temperature readings may be more readily ascertained.

Another object of my improvement relates to means whereby differential readings may be obtained according to the use of one or another light modifying means in taking readings.

Another object is the provision of means whereby the telescopic means are arranged to be adjacent to and cooperative with the indicating means.

Another advantage of my construction relates to the provision of a housing whereby all of the cooperating parts including current source and meters are compactly assembled within the single instrument and are conveniently and readily operable at will.

These and other features will be hereinafter ascertained as the description proceeds, and it is obvious that modifications may be made without departing from the scope of the herein disclosure of the invention and the appended claims.

In the drawings herein, Fig. 1 is a front view of the device, partly in section through the lower part of my device at the center thereof on the line 1—1 of Fig. 2 and viewed in the direction of the arrows in Fig. 2, and Fig. 2 is a central vertical section of my device through the center of Fig. 1, showing same parts in elevation.

A telescope $a$ having the objective $b$ and inner lense $c$ passes through the main housing H and through the casing of a reading galvanometer $d$ supported by the housing H. This galvanometer may be of any of the usual types, such as the D'Arsonval or its equivalent. Mounted in the path of the rays of this telescope is a standard or comparison glow-lamp 1. This glow-lamp which may be of any suitable standard type is balanced with reference to the scale of the said galvanometer, and is replaceable in case of damage or defect.

The glow-lamp is mounted by the aid of a rubber packing or gasket 2, Figs. 1 and 2, in order to prevent entry of caustic gases or liquids into the interior of the instrument.

The galvanometer is provided with a circular rotatable outer casing or annular member $e$ which contains a suitable resistance coil 3 having a sliding contact 4 shown in Fig. 1 and constituting a rheostat. The edge of said casing is milled or knurled so that it can be conveniently rotated by hand, whereby mutual adjustment between the built-in lamp regulating resistance 3 and the contact slide 4 is effected.

At the bottom of a housing H is a hollow portion which forms a handle $f$ for the instrument and into the interior 5 of which is inserted a small pocket lamp electric dry cell 6 of about 2 v. or a small pocket lamp battery of 4 v. approximately.

In case of measurements of more than average duration which would ordinarily drain the battery or if otherwise desired, this cell may be replaced by an external cell of larger capacity and of suitable potential. For this purpose apertures 7 are provided at the bottom end of the handle housing through which supply leads, not shown, from the outside source of current may be passed. At the base of the housing H as at 9 in Fig. 1, two connectors 10—11 are provided which may be of conventional type and which are suitably connected to the lamp 1 and to the resistance previously mentioned, and to these connectors any source, internal or external, of electric current supply may be attached.

Behind the dial housing $d$ and rearwardly of said housing H is adjustably supported a smoked glass screen 12 which, by means of the moving lever $h$ can be shifted into or out of the path of the optical axis.

In the front part of the instrument near the outer eyepiece 14, is disposed a colored glass 16, in the present instance red, mounted upon a rotary diaphragm-like disk $i$ which is pivotally mounted on a pin 8, which is eccentrically positioned with relation to said eye piece 14 and the axis of the telescope, and said disc $i$ has a milled edge $rs$ whereby either an aperture 17 or the red glass 16 are brought into the optical axis of the instrument when reading the scales of the galvanometer $d$.

By the smoked glass the light which enters from the luminous body of which the temperature is to be measured is diminished so that another constant has to be used for the measuring instrument than in the case of measurements without smoked glass. For this reason, for measurements with smoked glass, that is, at higher temperatures, another scale must be used than for measurements without the smoked glass, that is, measurements at lower temperatures.

The red glass 16 serves the purpose of making the measurement only by means of light of approximately constant wave-length, with the end in view to render differences in color in the radiation of the body under examination and the radiation of the lamp filament harmless or ineffective. The knurled (milled) knob $rs$ is turned sideways only when very low temperatures are dealt with, as otherwise comparisons between the brightness of the filament and the brightness of the thread of light produced by the luminescent body could not be made with sufficient sharpness.

The reading dial therefore is provided with two reading scales 20—21 one of which, the upper scale is graduated and arranged to read without the use of any of the screens. The lower dial 20 is arranged in a somewhat different ratio for the purpose of taking readings therefrom when measurements are made with the smoke glass screen 12, brought into axial alinement within the telescope $a$.

For the purpose of distinguishing one dial from another in its reading, symbols such as 22 and 23 are provided on each scale so that for instance the symbol at 22 being printed rather thin will indicate the reading of the dial when the optical axis is clear of the screen and the reading symbol 23 which is printed much thicker than the other signifies that the dial is arranged and divided for the reading of the instrument with the smoked screen located in the optical axis of the telescope.

The scale in both instances is calibrated in degrees centigrade, the numbering being conveniently chosen so that they may be multiplied upon reading by the factor of 100 so that any reading, if a reading for instance is 10° centigrade when the pointer or needle 24 is so regulated, then the sum 10 is multiplied by 100 indicating 1,000° centigrade.

What I claim and desire to protect by Letters Patent is:

1. In an optical pyrometer, in combination, a galvanometer, a telescope passing through the galvanometer and having an objective and an eye-piece, a lamp disposed between said objective and eye-piece in the path of the rays passing through the telescope, a screen disposed forwardly of said lamp and movable into and out of the optical axis of the telescope, a screen disposed rearwardly of said lamp and movable into and out of the optical axis of the telescope, resistance regulating means cooperating between said lamp and the galvanometer, and means for supplying electric current to said lamp and to said resistance regulating means.

2. In an optical pyrometer, in combination, a galvanometer, a telescope passing through the galvanometer and having an objective and an eye-piece, a lamp disposed between said objective and eye-piece in the path of the rays passing through the telescope, a screen disposed forwardly of said lamp and movable into and out of the optical axis of the telescope, a screen disposed rearwardly of said lamp and movable into and out of the optical axis of the telescope, resistance regulating means cooperating between said lamp and the galvanometer, means for supplying electric current to said lamp and to said resistance regulating means, means for reading the galvanometer during operation of the pyrometer when the first mentioned screen is disposed out of the optical axis of the telescope and the second mentioned screen is disposed in said axis, and means for reading the galvanometer during operation of the pyrometer when both said screens are disposed in the optical axis of the telescope.

3. In an optical pyrometer, in combination, a galvanometer, a telescope passing through the galvanometer and having an objective and an eye-piece, a lamp disposed between said objective and eye-piece in the path of the rays passing through the telescope and adjusted to the scale of the galvanometer, a screen disposed forwardly of said lamp and movable into and out of the optical axis of the telescope, a screen disposed rearwardly of said lamp and movable into and out of the optical axis of the telescope, resistance regulating means cooperating between said lamp and the galvanometer, means for supplying electric current to said lamp and to said resistance regulating means, and a dial on the galvanometer having a scale for reading the galvanometer during operation of the pyrometer when the first mentioned screen is disposed out of the optical axis of the telescope and the second mentioned screen is disposed in said axis and having a scale for reading the galvanometer during operation of the pyrometer when both said screens are disposed in the optical axis of the telescope.

4. In an optical pyrometer, in combination, a main housing, a casing supported by the main housing and having a galvanometer therein, a telescope passing through the main housing and through the galvanometer and having an objective and an eye-piece, a lamp disposed in said housing between said objective and eye-piece in the path of the rays passing through the telescope, a rotatable member on the exterior of the galvanometer casing, means appurtenant to said member constituting a rheostat and operable by rotation of said member for cooperating between said lamp and the galvanometer, means for supplying electric current to said lamp and to the last mentioned means, and means on the galvanometer for reading the galvanometer during operation of the pyrometer.

5. In an optical pyrometer, in combination, a main housing, a casing supported by the main housing and having a galvanometer therein, a telescope passing through the main housing and through the galvanometer and having an objective and an eye-piece, a lamp disposed in said housing between said objective and eye-piece in the path of the rays passing through the telescope and adjusted to the scale of the galvanometer, a smoked glass screen disposed rearwardly of said lamp and movable into and out of the optical axis of the telescope, a colored glass screen disposed forwardly of said lamp and movable into and out of the optical axis of the telescope, a rotatable annular member on the exterior of the galvanometer casing having appurtenant thereto a resistance coil and a contact member constituting a rheostat cooperating between said lamp and the galvanometer and operable by rotation of said member, means for supplying electric current to said lamp and to said rheostat constituting means, a scale on the galvanometer for reading the galvanometer during operation of the pyrometer when the smoked glass screen is out of the optical axis of the telescope and the colored glass screen is in said axis, and a scale on the galvanometer for reading the galvanometer during operation of the pyrometer when both the smoked glass and the colored glass screens are in the optical axis of the telescope.

6. In an optical pyrometer a galvanometer, a casing, enclosing the same, a telescope, passing through said casing and having thereon an objective, positioned beyond said casing, and an eye-piece, positioned in front of said casing, a lamp, disposed beyond said casing between said objective and eye-piece in the path of the rays passing through the telescope, resistance regulating means, disposed in front of said casing, for cooperating between said lamp and the galvanometer, and means for supplying electric current to said lamp and said resistance regulating means.

7. In an optical pyrometer a galvanometer, a casing, enclosing the same, a telescope, passing through said casing and having thereon an objective, positioned beyond said casing, and an eye-piece, positioned in front of said casing, a lamp, disposed beyond said casing between said objective and eye-piece in the path of the rays passing through the telescope, an extension on said casing, forwardly thereof, enveloping the front part of said telescope, an angularly movable member, swivelled on said extension, a resistance regulating means, for cooperating between said lamp and said galvanometer, mounted on and operable by the turning of said member, and means for supplying electric current to said lamp and to said resistance regulating means.

8. In an optical pyrometer a galvanometer, a casing, enclosing the same, a telescope, passing through said casing and having thereon an objective, positioned beyond said casing, and an eye piece, positioned in front of said casing, a lamp, disposed beyond said casing between said objective and eye-piece in the path of the rays passing through the telescope, an extension on said casing, forwardly thereof, enveloping the front part of said telescope, an angularly movable member, swivelled on said extension, a resistance regulating means, for cooperating between said lamp and said galvanometer, mounted on and operable by the turning of said member, and means for supplying electric current to said lamp and to said resistance regulating means.

9. In an optical pyrometer a galvanometer, a casing, enclosing the same, a telescope, passing through said casing and having thereon an objective, positioned beyond said casing, and an eye piece, positioned in front of said casing, a lamp, disposed beyond said casing between said objective and said eye-piece in the path of the rays passing through said telescope, an extension on said casing forwardly thereof, an angularly movable member, swivelled on said extension, a resistance coil and a contact, constituting a rheostat, for cooperating between said lamp and said galvanometer, mounted on and operable by the turning of said member, and means for supplying electric current to said lamp and to said rheostat constituting means.

10. In an optical pyrometer a galvanometer, a casing, enclosing the same, a telescope, passing through said casing and having thereon an objective, positioned beyond said casing, and an eye piece, positioned in front of said casing, a lamp, disposed beyond said casing between said objective and said eye piece in the path of the rays passing through said telescope, a screen, pivotally mounted and eccentrically disposed with relation to said eye-piece and the axis of said telescope, whereby said screen is movable into and out of the optical axis of said telescope, a screen, adjustably mounted beyond said lamp, a means for moving said screen into and out of the optical axis of the telescope, connected to said telescope, resistance regulating means, for cooperating between said lamp and said galvanometer, and means for supplying electric current to said lamp and to said resistance regulating means.

11. In an optical pyrometer a galvanometer, a casing, enclosing the same, a telescope, passing through said casing and having thereon an objective, positioned beyond said casing, and an eye-piece, positioned in front of said casing, a lamp, disposed beyond said casing between said objective and said eyepiece in the path of the rays passing through said telescope, a screen, pivotally mounted and eccentrically disposed with relation to said eye piece and the axis of said telescope, whereby said screen is movable into and out of the optical axis of said telescope, resistance regulating means, for cooperating between said lamp and said galvanometer, and means for supplying electric current to said lamp and to said resistance regulating means.

12. In an optical pyrometer a galvanometer, a casing enclosing the same, a telescope, passing through said casing and having thereon an objective, positioned beyond said casing and an eye-piece, positioned in front of said casing, a lamp, disposed beyond said casing between said objective and said eyepiece in the path of the rays passing through said telescope, a screen, adjustably mounted beyond said lamp, a means, for moving said screen into and out of the optical axis of the telescope, connected to said telescope, resistance regulating means, for cooperating between said lamp and said galvanometer, and means for supplying electric current to said lamp and to said resistance regulating means.

13. In an optical pyrometer a galvanometer, a casing enclosing the same, a telescope, passing through said casing and having thereon an objective, positioned beyond said casing, and an eye-piece, positioned in front of said casing, a lamp, disposed beyond said casing between said objective and said eye-piece in the path of the rays passing through said telescope, a disc, pivotally connected and eccentrically disposed with relation to said eye-piece and the axis of said telescope, a colored glass mounted in a part of said disc, to be turned thereon into and out of alignment with said eye piece and the axis of the telescope, said disc having therein in another part thereof an aperture, to be turned therewith alternately into and out of alignment with said axis, resistance regulating means, for cooperating between said lamp and said galvanometer, and means for supplying electric current to said lamp and to said resistance regulating means.

14. In an optical pyrometer a galvanometer, a casing, enclosing the same, a telescope, passing through said casing and having thereon an objective, positioned beyond said casing and an eye-piece, positioned in front of said casing, a lamp disposed beyond said casing between said objective and said eye piece in the path of the rays passing through the telescope, a housing, for enclosing said lamp, a downwardly extending hollow portion at the lower end of said housing, to serve as a handle for the instrument, resistance regulating means, disposed in front of said casing, for cooperating between said lamp and said galvanometer, and one or more batteries in said hollow portion for supplying electric current to said lamp and said resistance regulating means.

Signed at Frankfort-on-the-Main, Germany, this 22d day of June, A. D. 1926.

ADOLF BESTELMEYER.